US010108425B1

(12) United States Patent
Szanto et al.

(10) Patent No.: US 10,108,425 B1
(45) Date of Patent: Oct. 23, 2018

(54) HIGH-EFFICIENCY DIGITAL SIGNAL PROCESSING OF STREAMING MEDIA

(71) Applicant: Superpowered Inc., Austin, TX (US)

(72) Inventors: Gabor Szanto, Kapolnasnyek (HU); Alexander Patrick Vlaskovits, Irvine, CA (US)

(73) Assignee: Superpowered Inc., Austin, TX (US)

( * ) Notice: Subject to any disclaimer, the term of this patent is extended or adjusted under 35 U.S.C. 154(b) by 139 days.

(21) Appl. No.: 15/333,746

(22) Filed: Oct. 25, 2016

Related U.S. Application Data

(62) Division of application No. 14/804,217, filed on Jul. 20, 2015, now Pat. No. 9,583,116.

(60) Provisional application No. 62/027,108, filed on Jul. 21, 2014.

(51) Int. Cl.
    G06K 9/00 (2006.01)
    G06F 9/30 (2018.01)

(52) U.S. Cl.
    CPC ...... *G06F 9/30189* (2013.01); *G06F 9/30145* (2013.01)

(58) Field of Classification Search
    CPC .... H04N 19/176; H04N 19/593; H04N 19/61; H04N 19/103; H04N 19/124
    USPC ............... 382/100; 717/149, 162; 712/218, 712/E9.049, E9.061, E9.071; 718/102, 718/104; 713/300; 342/90
    See application file for complete search history.

(56) References Cited

U.S. PATENT DOCUMENTS

| | | | | |
|---|---|---|---|---|
| 5,155,817 | A | * | 10/1992 | Kishigami ............ G06F 9/3836 712/218 |
| 5,226,108 | A | | 7/1993 | Hardwick et al. |
| 5,355,492 | A | | 10/1994 | Frankel et al. |
| 5,379,044 | A | * | 1/1995 | Carlson ................. G01S 13/726 342/90 |
| 5,471,593 | A | | 11/1995 | Branigin |
| 5,511,172 | A | | 4/1996 | Kimura et al. |
| 5,724,565 | A | | 3/1998 | Dubey et al. |
| 6,738,892 | B1 | | 5/2004 | Coon et al. |
| 9,002,035 | B2 | | 4/2015 | Umeyama et al. |
| 9,432,298 | B1 | * | 8/2016 | Smith ................. H04L 49/9057 |
| 2003/0074655 | A1 | * | 4/2003 | Robison ................. G06F 8/434 717/162 |
| 2006/0265712 | A1 | * | 11/2006 | Zhou ..................... G06F 9/5038 718/102 |
| 2011/0067015 | A1 | * | 3/2011 | Takagi .................... G06F 8/456 717/149 |
| 2014/0037108 | A1 | | 2/2014 | Christoph |
| 2014/0108828 | A1 | * | 4/2014 | Breternitz .............. G06F 1/329 713/300 |

* cited by examiner

*Primary Examiner* — Charlotte M Baker
(74) *Attorney, Agent, or Firm* — Charles Shemwell

(57) ABSTRACT

A computing device reorders an iteratively executed sequence of instructions such that constituent instructions that require longer execution time than other constituent instructions are grouped together. The computing device inserts, within the iteratively executed sequence of instructions, one or more additional instructions to enable parallel execution of two or more instances of the sequence of instructions such that the constituent instructions that require longer execution time will be executed concurrently with the other constituent instructions.

11 Claims, 3 Drawing Sheets

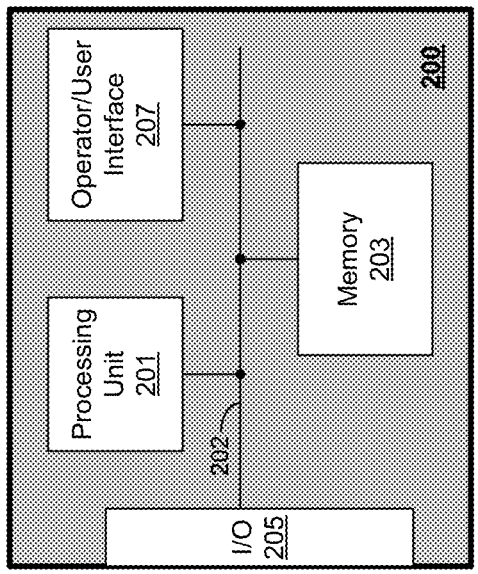
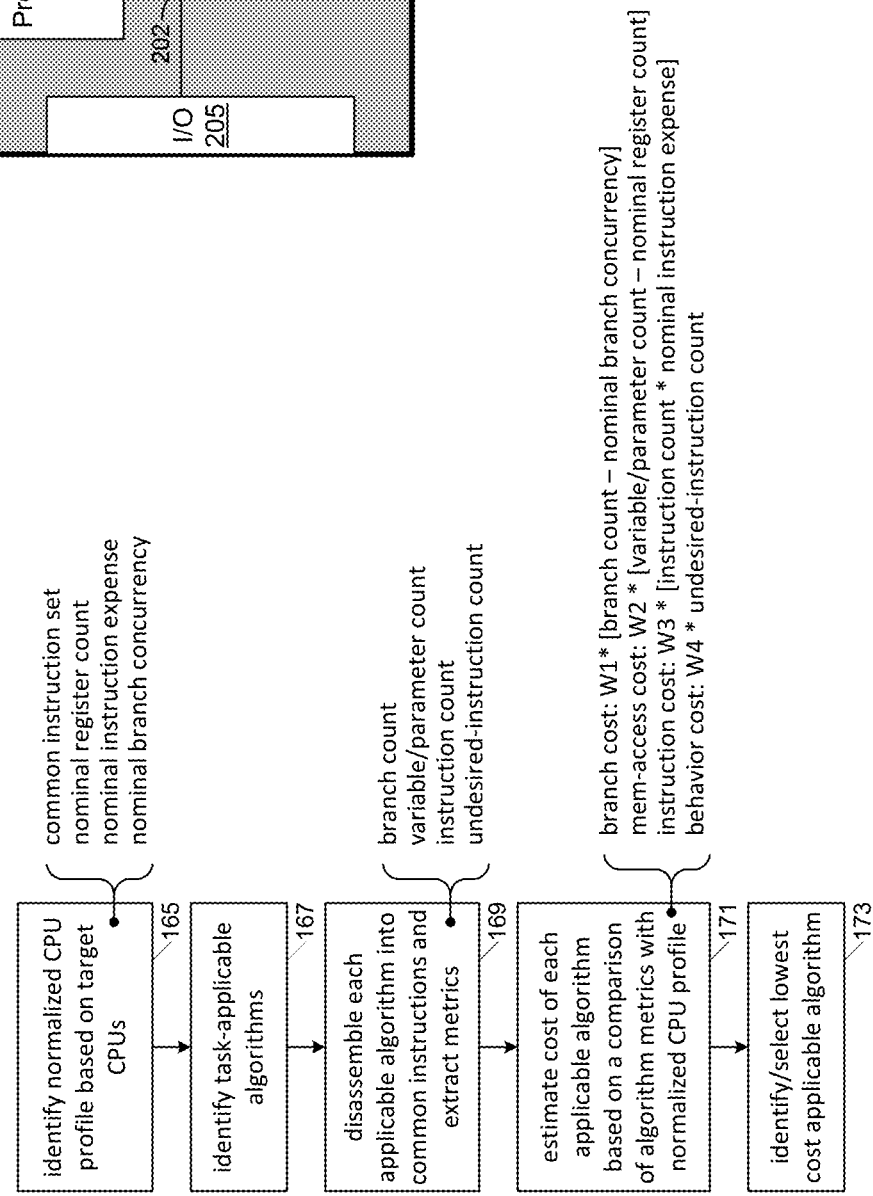

HIGH-EFFICIENCY DIGITAL SIGNAL PROCESSING OF STREAMING MEDIA

CROSS-REFERENCE TO RELATED APPLICATIONS

This non-provisional application is a divisional of pending U.S. patent application Ser. No. 14/804,217, filed Jul. 20, 2015 and entitled "High-Efficiency Digital Signal Processing of Streaming Media," which claims the benefit of U.S. Provisional Application No. 62/027,108, filed Jul. 21, 2014 and entitled "High-Efficiency Digital Signal Processing." Each of the foregoing patent applications is hereby incorporated by reference herein in its entirety.

TECHNICAL FIELD

The disclosure herein relates to digital signal processing (DSP).

BACKGROUND

Modern digital signal processing of streaming audio and video data is typically implemented through DSP program execution in a general purpose or special purpose processor. Unfortunately, due largely to the traditional focus on platform neutrality, forward/reverse compatibility and layered implementation, extant DSP implementations tend to be resource and power hungry, often consuming a substantial portion of the CPU and memory bus budget. In many cases the processing inefficiency itself drives up end-to-end latency, thus requiring additional memory-consumptive and power-consumptive data buffering and, in some instances, yielding undesirable user-perceivable artifacts in the video/audio output.

BRIEF DESCRIPTION OF THE DRAWINGS

The disclosure herein is illustrated by way of example, and not by way of limitation, in the figures of the accompanying drawings and in which like reference numerals refer to similar elements and in which:

FIG. 4 illustrates an exemplary sequence of operations executed by an algorithm selection engine to automatically evaluate a set of task-applicable algorithms and select one of the task-applicable algorithms based upon programmed or dynamically supplied metrics; and FIG. 5 illustrates a generalized embodiment of a computing element, system or device that may be used to implement any or all of the modules and engines and/or other system components described in reference to FIGS. 1-4.

DETAILED DESCRIPTION

High-performance streaming data processing systems and techniques are disclosed in various embodiments herein, together with embodiments of automated methods and systems for implementing such data processing systems and techniques. In a number of embodiments, for example, a phase vocoder useful for executing frequency-domain time-stretching, pitch-shifting and convolution operations with respect to an audio data stream is implemented with a mapped transform that significantly reduces cumulative floating point error across the output spectral array of a short-time Fourier transform (STFT) and significantly cuts processing time and resource consumption. In other embodiments, an optimization engine is executed to automatically reorganize operations within an iterative execution loop to eliminate processor stalls/waits and enable remaining stall/wait time to be hidden under parallel execution of non-stalling operations. In yet other embodiments, an algorithm selection engine is executed to automatically evaluate task-applicable algorithms (e.g., program code sequences) in view of a normalized CPU profile and select one of the task-applicable algorithms based upon programmed or dynamically supplied metrics. These and other features and embodiments are described in further detail below.

Figure 1:
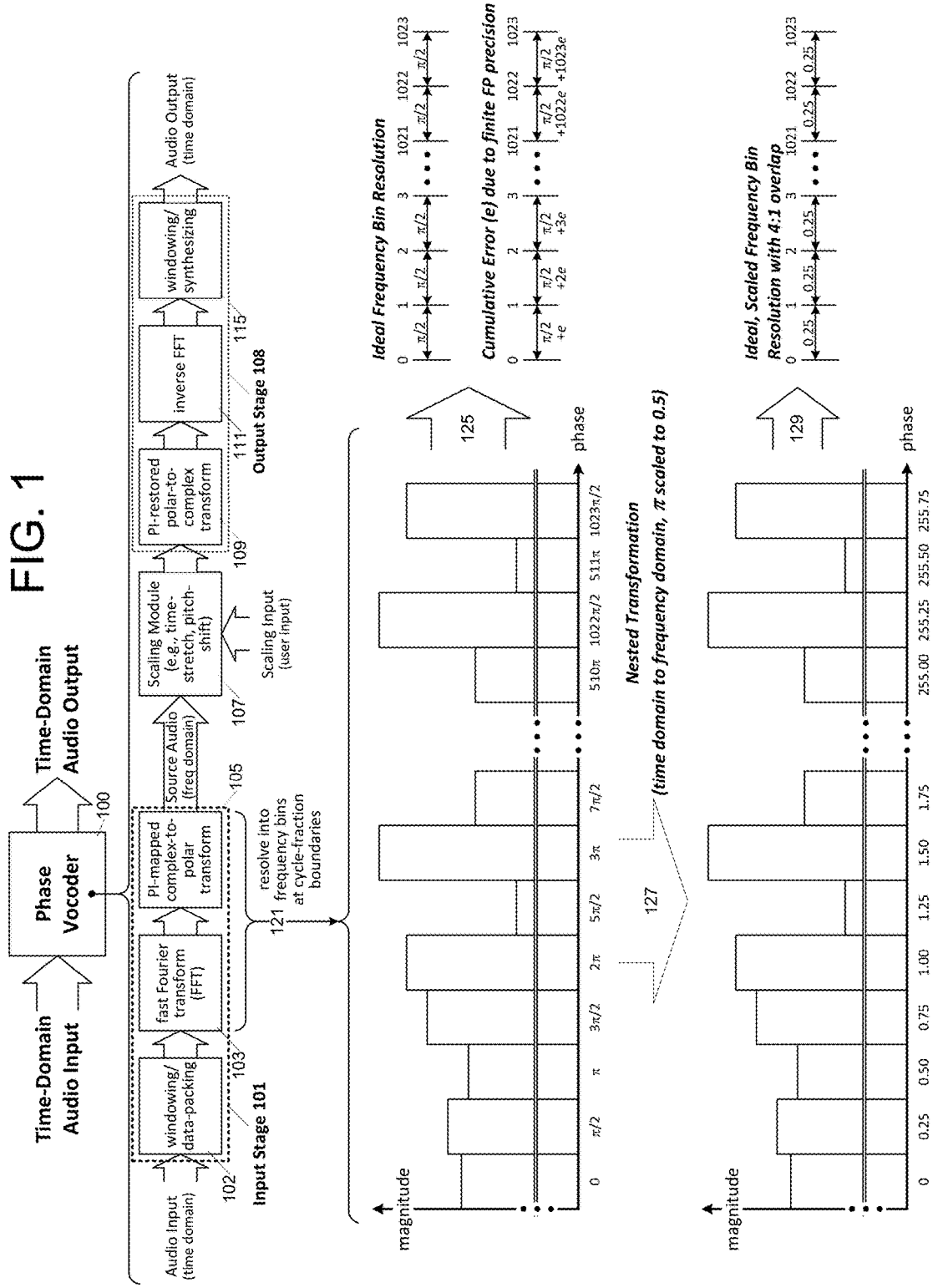
FIG. 1 illustrates an embodiment of a phase vocoder that generates a Pi-mapped spectrally-binned output and executes a Pi-mapped complex-to-polar transform.

FIG. 1 illustrates an embodiment of a phase vocoder 100 that generates a Pi-mapped spectrally-binned output and executes a Pi-mapped complex-to-polar transform. In the particular implementation shown, phase vocoder 100 includes an input stage 101, scaling/convolving module 107, and output stage 108. Input stage 101 is itself formed by a windowing/data-packing module 102, fast Fourier transform (FFT) engine 103 and Pi-mapped complex-to-polar transform module 105, and output stage 108 is similarly formed by a Pi-restoring polar-to-complex transform module 109, inverse-FFT engine 111 and windowing/synthesizing module 115. The windowing function within module 102 and FFT engine 103 may be viewed collectively as a short-time Fourier transform (STFT) engine, and the inverse FFT engine 111 and windowing function of module 115 may similarly be viewed as an inverse STFT engine. Also, additional/different modules may be implemented within the input and/or output stages in alternative embodiments, and module 107 may be supplemented with additional capability beyond scaling (e.g., time-stretching and pitch-shifting as discussed below) and convolving.

During phase vocoder operation, the windowing/data-packing module 102 divides an incoming audio-input into time-overlapped segments or "windows" that are subject to respective transformations within FFT engine 103. The windowing/data-packing module may also implement a digital filtering of the audio time slice, for example, to smooth sharp (high-frequency) signal transitions at the leading and trailing edges of the window and thus limit artifacts in the spectral result of the FFT.

FFT engine 103 resolves the spectral components of each time-domain window into a set of frequency bins generally as shown at 121, with the spectral component in each frequency bin being a complex value representative of the component's amplitude and phase at that frequency. To facilitate time-stretching, pitch-shifting, convolution and other audio effects, the complex-number spectral component is converted to its corresponding polar representation (i.e., magnitude and phase), an operation that tends to be computationally intensive (and thus power consumptive) in terms of both processor operation cycles and memory/register usage. From the standpoint of real-time audio processing, the complex-to-polar transform constitutes one of several high-power/high-resource-consumption operations that tend to drive up phase vocoder CPU load (thus incurring yet further power consumption). Moreover, as the FFT frequency bins are generally resolved at fractional cycle boundaries, the finite-precision floating point representation of poorly behaved numbers, Pi in particular (i.e., the ratio of a circle's circumference and diameter), tends to yield a bin-to-bin error, 'e'. As shown generally at 125, this bin-width error is cumulative across the bins of the FFT output array so that, given an array with, for example, $2^{10}$ (i.e., 1024) spectral components (i.e., phase and amplitude representations), a non-negligible phase error results toward the upper end of the array, with a worst-case error of 1023*e*. This phase error is often perceived and characterized by a listener as a "phasiness" or loss of presence—an undesirable artifact in the reconstructed audio output.

In one embodiment, cumulative phase error in the frequency separation of the FFT output bins is avoided through an operation referred to herein as Pi-scaling (or Pi-mapping). More specifically, by mapping the radian representation of a full sinusoidal cycle (i.e., $2\pi$ or 2*Pi) to a well behaved floating point numeral such as "1.0" when generating the FFT output array, it becomes possible to obtain an ideal (i.e., errorless) frequency bin resolution from bin to bin. Complex-to-polar transform module 105 may carry out a corresponding Pi-mapped operation as discussed below. Because the mapping scales only the frequency of each spectral component, any pitch shifting effected within the scaling module 107 may readily be scaled in inverse proportion (i.e., multiplied by 2*Pi) to yield the desired frequency change. Moreover, as the output of the scaling module is restored to complex form prior to inverse FFT operation, the Pi-scaling effected within the complex-to-polar transform module 105 and FFT engine 103 is easily reversed (i.e., restoring to full frequency step from bin to bin) in the polar-to-complex transform module 109 and inverse FFT engine 111. In general, the polar-form frequency bin scaling (referred to herein as a nested transformation as it rides atop the time-to-frequency domain transform effected by the FFT) is illustrated graphically at 127, with Pi mapped to 0.5 as shown at 129.

Figure 2:
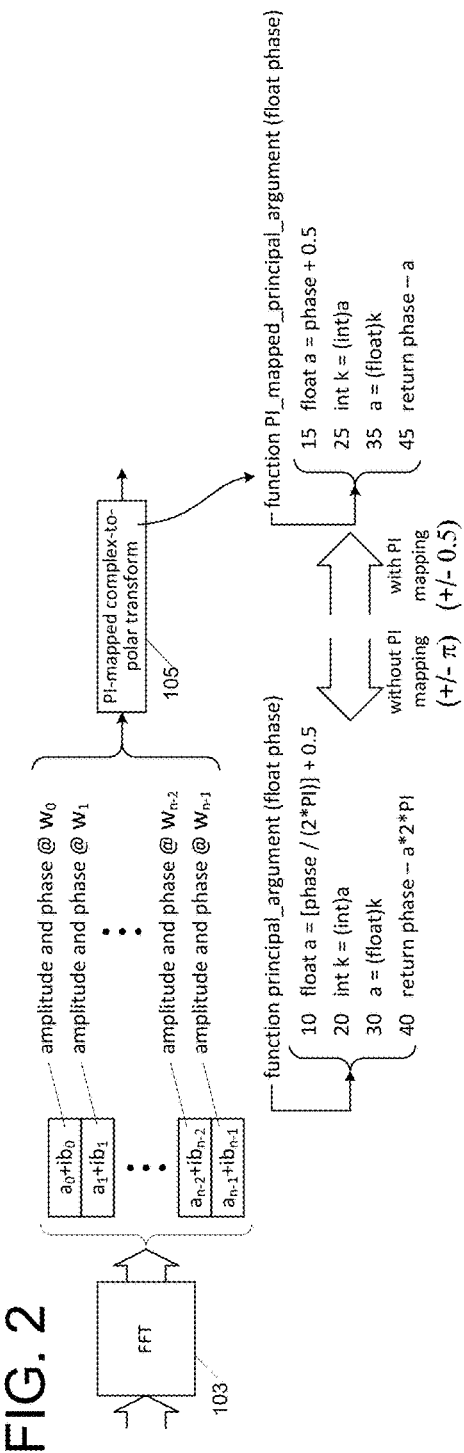
FIG. 2 illustrates a principal argument calculation within the Pi-mapping complex-to-polar transform module 105 of FIG. 1.

FIG. 2 illustrates another benefit of the Pi-mapping operation within the complex-to-polar transform module 105 of FIG. 1. More specifically, calculation of the principal argument of the polar phase value (i.e., a modulo 2*Pi operation) becomes substantially more efficient in terms of both processor cycle count and register/memory requirements. Comparing the pseudocode listing of a principal argument determination with and without Pi-mapping, for example, it can be seen that, without Pi-mapping, a modulo 2*Pi operation is executed by dividing an incoming "phase" parameter by 2*Pi (or multiplying by 1.0/2*Pi at line 10, followed by a floating point round effected by the addition of 0.5 in line 10 and the type conversion operations at lines 20 and 30, and finally a multiply/subtract (again multiplying by 2*Pi) at line 40. By contrast, in the Pi-scaled implementation (i.e., Pi scaled to 0.5), the division and subsequent multiplication by 2*Pi become a division and multiplication by unity and thus disappear altogether, leaving only the primitive components of the floating point round (i.e., adding 0.5 at line 15, type-converting to integer and then back to floating point in lines 25 and 35) and subtraction operations (in function return line 45). In a typical mobile device processor, the floating point multiply and multiply-subtract operations generally require roughly 11 operational cycles, while the addition, type conversion and subtraction operations require only 10 or so cycles. Accordingly, the Pi-mapped polar representation enables the otherwise compute-intensive principal argument function (invoked at least once per frequency bin) to be executed in dramatically fewer compute cycles (e.g., 10 cycles instead of 18 in an embodiment in which the subtraction operation requires three cycles). The speed-up may be even more pronounced where the addition of 0.5 is hidden within the phase value calculation itself (i.e. already present in the incoming phase parameter) and even faster yet in processors capable of type-converting a floating point operand to integer and back to floating point in a single instruction (sometimes referred to as a "FRINT" instruction or operation).

Figure 3:
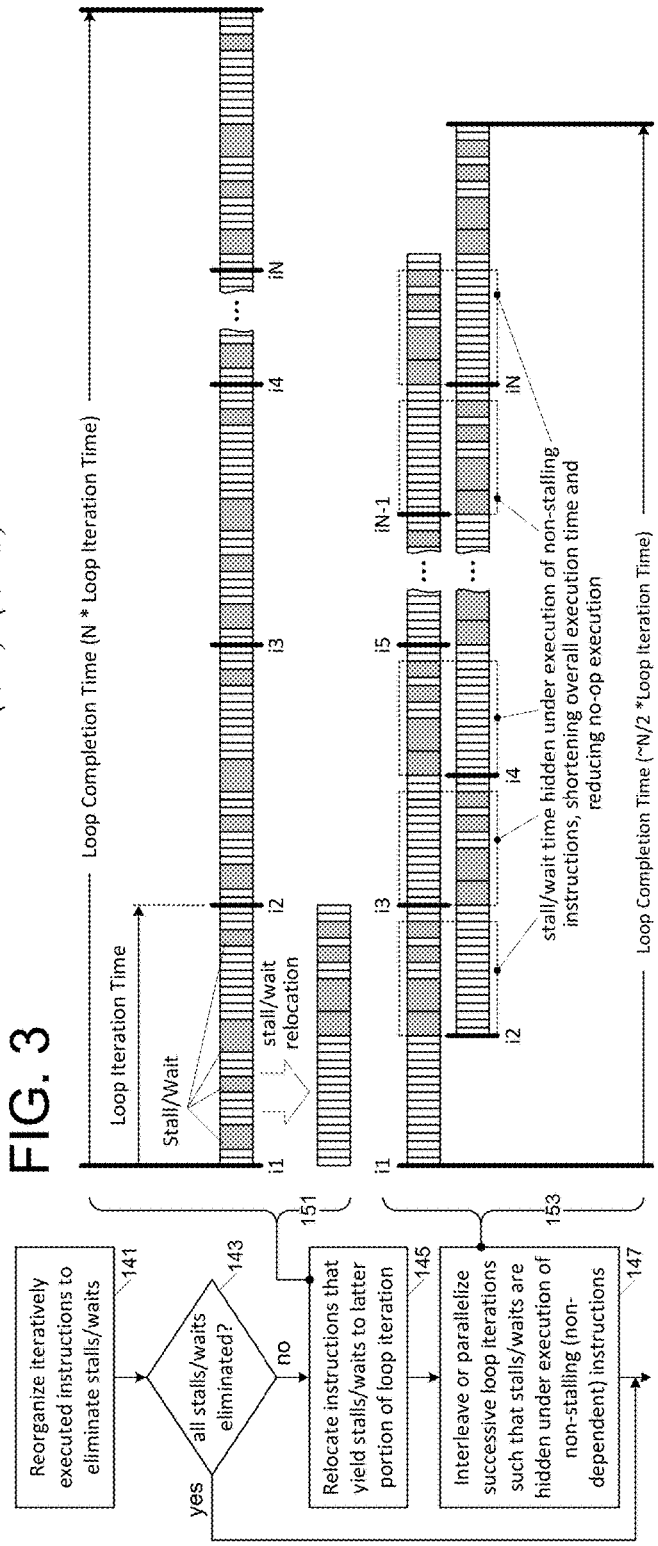
FIG. 3 illustrates an exemplary sequence of operations carried out by an optimization engine within an automated program code generation system to eliminate stalls/waits within looped instruction execution and enable non-eliminated stalls/waits to be hidden under non-stalling operations.

FIG. 3 illustrates an exemplary sequence of operations carried out by an optimization engine within an automated program code generation system to eliminate stalls/waits within looped instruction execution and enable non-eliminated stalls/waits to transpire in parallel with (and thus be hidden under) non-stalling operations. Starting at 141, the optimization engine inspects the instruction sequence specified within a given looped program code instance (e.g., program instructions that appear within a "for" loop or "while" loop) and reorganizes the instructions to eliminate or otherwise reduce delays caused by stalls and waits. For example, if a given program instruction involves a function call that will yield a relatively slow stack push/pop (i.e., sequence of memory access as program parameters are pushed onto a stack by the invoking code line and then pulled back off the stack by the invoked program code or subroutine) that is likely to result in a processor stall or wait (i.e., waiting for the memory read effected by the stack pop operation), the optimization engine may instantiate the invoked function inline (i.e., incorporating the constituent instructions of the program code into the body of the function-invoking code sequence in place of the function call itself) to avoid the stack push/pop operations altogether and thus eliminate the corresponding processor stall/wait. Taking the principal argument function shown in FIG. 2 as an example, a function call to the principal argument function (which would ordinarily involve transferring the phase value or an array of such values, otherwise stored in a processor register, to the region of system memory allocated to the stack, followed by a read back from that stack location upon redirecting the program counter to the start of the invoked function) may be replaced by the constituent instructions of the principal argument function so that no stack push/pop operation is necessary, neither at function invocation (as no function is ever invoked), nor upon function exit. Various other types of operations that yield processor stalls/waits may also be identified and eliminated.

Still referring to FIG. 3, if all stalls/waits are eliminated from the looped program code (affirmative determination at 143), the optimization is complete and the optimization engine proceeds to the next looped program code instance. If some number of identified stalls/waits remain however (i.e., negative determination at 143), the optimization engine attempts to relocate instructions that yield stalls/waits to a latter portion of the loop iteration. This operation is shown graphically at 151, with stall/wait operations in effect being compacted toward the end of the loop iteration time. In one embodiment, for example, the optimization engine identifies non-dependent sequences of operations within the loop iteration, unifying/contiguating the individual instructions of each operational sequence and reordering the operational sequences within the loop iteration in accordance with their respective aggregate stall/wait time (e.g., sequence with lowest total stall/wait time ordered first, sequence with next-lowest total stall/wait time second, and so forth such that the sequence with the highest total stall/wait time is ordered last).

Continuing with FIG. 3, at 147, the optimization engine inserts program code (e.g., OS call to invoke an execution thread) within the loop body to enable overlapped/concurrent execution of two or more loop iterations such that the stall/wait-laden portion of one loop iteration is partially or completely hidden under execution of the non-stalling (or less-stall/waiting) instructions. In the particular example shown at 153, the stalling and non-stalling portions of the loop body each consume approximately 50% of the loop iteration time, thus permitting a second loop execution to be initiated halfway through an initial loop execution to yield a net loop execution time that is approximately half the non-parallelized loop execution time (i.e., Loop Iteration Time*N/2 vs. Loop Iteration Time*N, where 'N' is the number of loop iterations).

FIG. 4 illustrates an exemplary sequence of operations executed by an algorithm selection engine to automatically evaluate a set of task-applicable algorithms (e.g., discrete program code sequences and/or collections of discrete program code sequences) and select one of the task-applicable algorithms based upon programmed or dynamically supplied metrics. Starting at 165, the algorithm selection engine identifies a normalized processor (CPU) profile based on a target set of commercially available and/or proprietary CPUs (e.g., target set of CPUs specified by user input, loaded from a configuration library, etc.). In one embodiment, for example, the algorithm selection engine may access instruction set and programming model libraries for a wide range of commercially available set of CPUs and thus identify, for a given target set of CPUs, a common instruction set (i.e., set of instructions executable by each processor in the target set), a nominal register count (e.g., lowest common denominator, average or median count, etc.), a nominal instruction expense in terms of processor operation cycles (e.g., maximum, average or median number of cycles for each instruction in the common instruction set), a nominal branch concurrency (or speculative execution) capability, etc.

At 167, the algorithm selection engine identifies a pool of task-applicable algorithms based on user-input or other configuration information, receiving, for example, an assembly-language or high-level language encoding of each algorithm (or a pointer thereto). At 169, the algorithm selection engine disassembles each applicable algorithm into one or more sequences of common instructions (i.e., instructions drawn out of the common instruction set) and extracts a set of metrics from the disassembled code including, for example and without limitation, branch count, variable/parameter count, total instruction count, and count of "undesired" instructions (e.g., instructions pre-qualified as falling into a high-expense category in terms of processor cycles, register consumption, etc.). At 71, the algorithm selection engine scores each of the applicable algorithms, estimating a "cost" of each based on a weighted evaluation of the extracted metrics in view of the normalized CPU profile. In one embodiment, for example, the engine generates a score by summing a branch cost, memory access cost, instruction cost, behavior cost, etc., of each applicable algorithm, or any subset of such costs. As shown, a branch cost for a given algorithm may be generated, for instance, by multiplying a weighting value (W1) against the difference between the branch count for that algorithm and the nominal branch concurrency of the normalized CPU profile. Similarly, a memory access cost may be determined by multiplying another weighting value (W2) against the difference between the variable/parameter count for the algorithm and the nominal register count of the normalized CPU profile. An instruction cost may be assigned by multiplying another weighting value against the product of the algorithm's instruction count and the nominal instruction expense, and a behavior cost may be obtained by multiplying yet another weighting value with the undesired-instruction count. In an alternative embodiment, the algorithm selection engine may omit the behavior cost in favor of a more precisely determined instruction cost (e.g., a cost determination that sums the instruction expense per specific instruction in the algorithm). More generally, any of the specific calculations shown may be omitted or implemented differently, and additional or alternative metrics may be used. The weighting or scaling factors (W1, W2, W3, . . . ) applied to the components of the overall algorithm cost estimation (or cost determination) may be pre-configured according to application needs, supplied by a user (e.g., with the algorithm selection engine prompting the user via display to enter any one or more of the weighting factors), obtained from a configuration file, etc., and thus may vary based on user and/or application priorities.

However the weighting factors (if any) are determined or obtained, and whatever the specific cost estimation components and/or calculations may be, the individual cost estimates for each of the applicable algorithms are evaluated by the algorithm selection engine at 173, with the engine identifying the lowest cost algorithm. The algorithm selection engine may signal the algorithm identification/selection to a user directly (e.g., via display) and/or may automatically incorporate the algorithm into the program code instance under construction (e.g., linking a program code invocation to a resident instance of the selected algorithm, inserting the constituent instructions of the selected algorithm in line at an invocation point, etc.).

FIG. 5 illustrates a generalized embodiment of a computing element, system or device 200 that may be used to implement any or all of the modules and engines of the phase vocoder described in reference to FIGS. 1 and 2, the automated program code reorganization engine described in reference to FIG. 3 and/or the automated algorithm-selection engine described in reference to FIG. 4. As shown, computing element 200 includes a processing unit 201 formed by one or more general purposes or special purpose processors, memory 203 for storing program code executed by the processing unit to implement the various modules and engines of the above-described embodiments, and also to store the data streamed through the computing system (i.e., input and output video/audio data streams or portions thereof).

Computing element 200 further includes one or more input and/or output (I/O) ports 205 for receiving and outputting the data stream, and a user interface 207 to present and receive information to a human or artificial operator and thus enable operator control of system operation (e.g., set configuration, programmable values, etc.) as well as to interact with the larger host system in a manner intended by its core function. Note that the user interface may alternatively be implemented through one or more of I/O ports 205. Also, though not shown, numerous other functional blocks may be provided within the computing system according to its core function (and the computing system itself may be a component in a larger host device, appliance or network of devices/appliances). For example, when implemented within a mobile telephone, personal digital assistant, music or video player, etc., the computing system may be accompanied by or incorporate wireless (radio-frequency) communication circuitry, video rendering display and one or more transducers (e.g., microphones, speakers, etc.).

Still referring to FIG. 5, the functional blocks are depicted as being coupled by a communication path 202 which may include any number of shared or dedicated buses or signaling links. More generally, the functional blocks shown may be interconnected in a variety of different architectures and individually be implemented by a variety of different underlying technologies and architectures. With regard to the memory architecture, for example, multiple different classes of storage may be provided within memory 203 to store different classes of data. For example, non-volatile storage media such as fixed or removable magnetic, optical, or semiconductor-based recording media may be provided to store executable code and related data (or receivable within such system to enable receipt of such executable code and related data), while volatile storage media such as static or dynamic RAM for storing variable data.

The various methods and techniques disclosed herein may be implemented through execution of one or more a sequences of instructions (i.e., software program(s)) within the processing unit 201, or by a custom-built hardware ASIC (application-specific integrated circuit), or programmed on a programmable hardware device such as an FPGA (field-programmable gate array), or any combination thereof. If a purely hardware-based execution engine is provided, the processing unit 201 and related circuitry may be omitted from computing element 200.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computing system or consumer electronic device or appliance, such as the computing element, system, device or appliance described in reference to FIG. 5.

Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed subject matter. In some instances, the terminology and symbols may imply specific details that may be optional or variable within a given implementation. For example, the term "coupled" is used herein to express a direct connection as well as a connection through one or more intervening circuits or structures. Device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

Also, various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A computing device having one or more processors and a memory to store program code which, when executed by the one or more processors, causes the one or more processors to:
   reorder a sequence of instructions that is to be iteratively executed within an execution thread to produce a reordered sequence of instructions in which constituent instructions that require longer execution time than other constituent instructions are grouped together; and
   insert, within the reordered sequence of instructions, one or more additional instructions to enable parallel execution of two or more instances of the sequence of instructions such that the constituent instructions that require longer execution time will be executed concurrently with the other constituent instructions such that time required for multiple executions of the sequence of instructions is reduced.

2. The computing device of claim 1 wherein the one or more processors are further caused to revise the sequence of instructions, before reordering to produce the reordered sequence of instructions, to eliminate one or more time-consuming memory access operations.

3. The computing device of claim 2 wherein revising the sequence of instructions to eliminate the one or more time-consuming memory access operations comprises replacing a subroutine invocation instruction with an inline instance of instructions that implement the function of the subroutine.

4. The computing device of claim 1 wherein reordering the sequence of instructions comprises relocating the constituent instructions that require longer execution time toward the beginning or end of the reordered sequence of instructions.

5. A computing device having one or more processors and a memory to store program code which, when executed by the one or more processors, causes the one or more processors to:
   identify a normalized processor profile having a set of feature common to all processors within a specified set of commercially available processors;
   generate, for each of a plurality of algorithms capable of executing a predetermined task, a respective score indicating an estimated cost of the algorithm if executed by the normalized processor;
   identify a first algorithm of the plurality of algorithms based at least in part on the respective score for each of the plurality of algorithms; and
   incorporate, within a program code product intended to be executed within a variety of host devices each having a different set of one or more of the commercially available processors, program code instructions corresponding to the first algorithm such that aggregate cost of executing the predetermined task within each of the variety of host devices is reduced.

6. The computing device of claim 5 wherein generating a respective score indicating an estimated cost of each algorithm if executed by the normalized processor comprises disassembling the algorithm into instructions executable by the normalized processor.

7. The computing device of claim 6 wherein generating the respective score further comprises extracting metrics from the disassembly into instructions executable by the normalized processor, including determining at least one of a branch count, a parameter count, a variable count or an instruction count.

8. The computing device of claim 7 wherein generating the respective score further comprises generating a plurality of score components based on evaluation of at least one of the branch count, parameter count, variable count or instruction count in view of at least one of a register count, instruction expense or branch concurrency of the normalized processor.

9. The computing device of claim 8 wherein generating the respective score further comprises weighting evaluations of the branch count, parameter count, and instruction count non-uniformly.

10. The computing device of claim 9 further comprising a display and user-input device, and wherein the one or more processors are further caused to prompt a user via the display to enter, via the user-input device, weighting values to be applied in evaluations of the branch count, parameter count and instruction count.

11. The computing device of claim 5 wherein identifying the normalized processor profile having the set of features common to all processors within the specified set of commercially available processors comprises identifying a normalized processor profile having one or more of (i) an executable instruction set consisting of instructions common to instruction sets of all processors within the specified set of commercially available processors, (ii) a quantity of registers that does not exceed a quantity of registers within any processor within the specified set of commercially available processors, or (iii) a branch concurrency capability that does not exceed a branch concurrency capability of any processor within the specified set of commercially available processors.

* * * * *